United States Patent [19]

Hegler et al.

[11] Patent Number: 4,773,451

[45] Date of Patent: Sep. 27, 1988

[54] DOUBLE TUBING COMPRISING TWO PROTECTIVE TUBES INTEGRALLY JOINED TO ONE ANOTHER BY A WEB

[75] Inventors: Wilhelm Hegler, Goethestrasse 2, D-8730 Bad Kissingen; Ralph-Peter Hegler, Bad Kissingen, both of Fed. Rep. of Germany

[73] Assignee: Wilhelm Hegler, Kissingen, Fed. Rep. of Germany

[21] Appl. No.: 28,176

[22] Filed: Mar. 18, 1987

[30] Foreign Application Priority Data

Mar. 29, 1986 [DE] Fed. Rep. of Germany ....... 3610667

[51] Int. Cl.[4] .................................................. F16L 3/04
[52] U.S. Cl. ..................................... 138/106; 248/49; 248/68.1
[58] Field of Search ............... 138/106, 103, 104, 107, 138/111, 115, 116, 117, 121, 122, 173; 248/68.1, 49, 51, 52, 58, 60, 61; 174/68 C, 95

[56] References Cited

U.S. PATENT DOCUMENTS

| T100,605 | 5/1981 | Christian | 248/68.1 |
|---|---|---|---|
| 1,072,173 | 9/1913 | Schlafly | 138/173 X |
| 3,682,422 | 8/1972 | Evans | 248/68.1 |
| 3,776,679 | 4/1973 | Hegler | 425/325 |
| 4,534,923 | 8/1985 | Lupke | 138/121 X |
| 4,658,854 | 4/1987 | Hopkins et al. | 138/110 X |

FOREIGN PATENT DOCUMENTS

| 584985 | 5/1932 | Fed. Rep. of Germany | 138/106 |
|---|---|---|---|
| 1218574 | 12/1966 | Fed. Rep. of Germany | . |
| 2038991 | 10/1980 | Fed. Rep. of Germany | . |

Primary Examiner—Mark J. Thronson
Attorney, Agent, or Firm—Browdy and Neimark

[57] ABSTRACT

Double tubing comprises two flexible plastic protective tubes (1, 2), integrally joined with one another via a web (5), which are embodied as corrugated tubes. For installing the double tubing without damage and to prevent deformation of the protective tubes, and in this manner to make them particularly suitable for plumbing applications, fastening holes (11) for fastening screws (17) are embodied in the web (5). Each fastening hole (11) is embodied between two corrugation crests (3) disposed opposite one another in pairs, and in the area of the respective fastening hole (11) the crests (3) are deformed into secant-like defining walls (12) of the respective fastening hole (11).

14 Claims, 2 Drawing Sheets

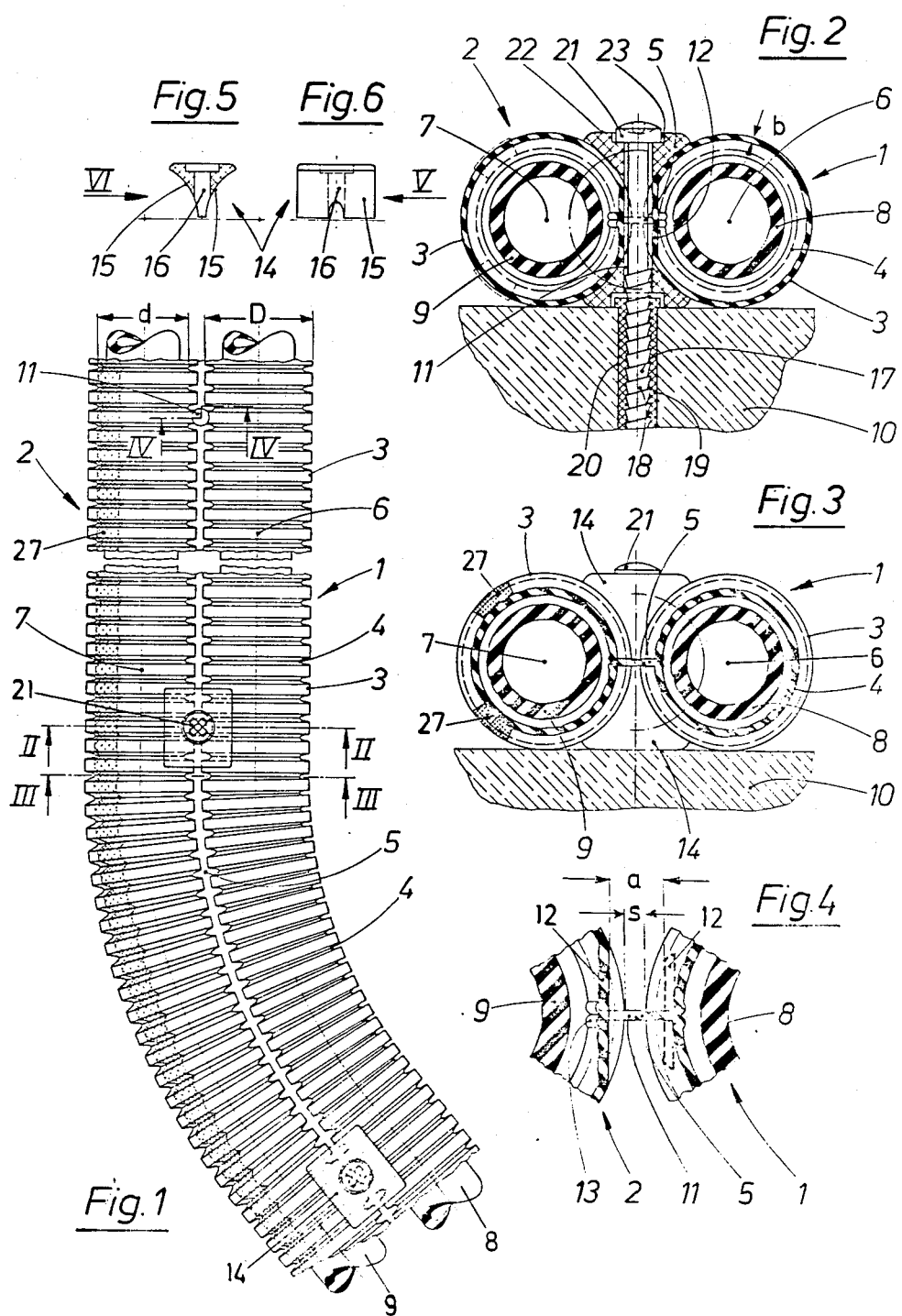

DOUBLE TUBING COMPRISING TWO PROTECTIVE TUBES INTEGRALLY JOINED TO ONE ANOTHER BY A WEB

The invention relates to flexible double tubing which can be easily installed and is useful for instance for plumbing application.

BACKGROUND OF THE INVENTION

Tubing of this kind, known from German Pat. No. 12 18 574, is used in electrical installation. It is fastened by nails, the nail being driven through the web and forming a hole in the area between two opposed hollows in the corrugation. There is a very great danger that the web will tear here. This is not important in the above-mentioned use of the known double tubing, but if double tubing of this kind is to be used for plumbing purposes, care must be taken to assure that it cannot become damaged while being installed.

German Pat. No. 20 38 991 discloses the use of a protective tube, embodied as a corrugated tube, as a shared protective tube for a hot water flow line and return line to and from radiators.

It is also known to secure plastic protective tubes to the floor or walls by means of ring clamps, these protective tubes receiving elastic tubes for plumbing purposes, in particular for flow and return lines for heating systems.

SUMMARY OF THE INVENTION

It is the object of the invention to embody double tubing of this generic type such that it can be installed in a simple manner, without the danger of damage or deformation and without impairing its flexibility in the primary plane defined by the axes of the two protective tubes.

This object is attained in accordance with the invention by providing fastening holes in a web connecting the two tubes which are formed to be corrugated, with each hole being located between respective parts of the corrugation of the opposing tubes having the greatest outside diameter, and wherein these opposing parts are deformed into secant-like walls defining each fastening hole. The specialized embodiment of the fastening hole assures that in installing and fastening the double tubing with screws or nails, tearing of the web and thus damage to at least one protective tube are precluded. The disposition and embodiment of the fastening hole according to the invention also makes it possible for the web joining the two protective tubes to have an extraordinarily slight width, so that the flexibility of the double tubing in the plane extending through the two axes of the protective tubes is extraordinarily favorable. Since the fastening means, that is, a screw in particular, does not rest directly against the web, and since the secant-like defining walls of the fastening hole in this area lend the protective tubes great strength at the apex, deformation of the tube during installation and fastening is precluded. For this reason, the double tubing according to the invention is particularly advantageously applicable to plumbing purposes, with an additional flexible tube being provided in the particular protective tube.

A particularly favorable and space-saving embodiment of the double tubing in the area of the fastening hole is provided by forming each secant-like deformation hole to extend approximately at a tangent to respective sections of the corrugated tubes having smaller diameter. An optimal width for the web, or in other words an optimization of the flexibility of the double tube, results the width of the web is provided to be between one and two times the thickness of the wall of each tube. A particularly preferred application involves using the two tubes as protective tubes for further tubes extending therein. Precisely because of the embodiment as double tubing, the tubing becomes very rigid in the longitudinal direction. This facilitates insertion of the inner tube by comparison with single protective tubes. The relatively high rigidity also reduces the danger of lateral deflection during installation at the construction site if a worker should stumble over the tubing.

Further provisions according to the present invention improve the property the double tubing has of not being deformable during installation, namely by fastening means for the double tubing being provided with particular shapes.

Additional advantages and characteristics of the invention will become apparent from the ensuing description of an exemplary embodiment taken in conjunction with the drawings.

BRIEF DESCRIPTION OF THE DRAWINGS

FIG. 1 shows double tubing according to the invention, in a plan view of a section of double tubing in a partially installed condition;

FIG. 2 is a cross section taken through the double tubing along the line II—II of FIG. 1, on a larger scale;

FIG. 3 is a further cross section taken through the double tubing along the line III—III of FIG. 1, again on a larger scale;

FIG. 4 is a fragmentary cross section through the double tubing along the offset line IV—IV of FIG. 1, on a still larger scale;

FIG. 5 is an end view of a fastening element viewed in the direction of the arrow V in FIG. 6;

FIG. 6 is a lateral longitudinal view of the fastening element viewed in the direction of the arrow VI in FIG. 5.

DESCRIPTION OF THE PREFERRED EMBODIMENTS

Figure 7:
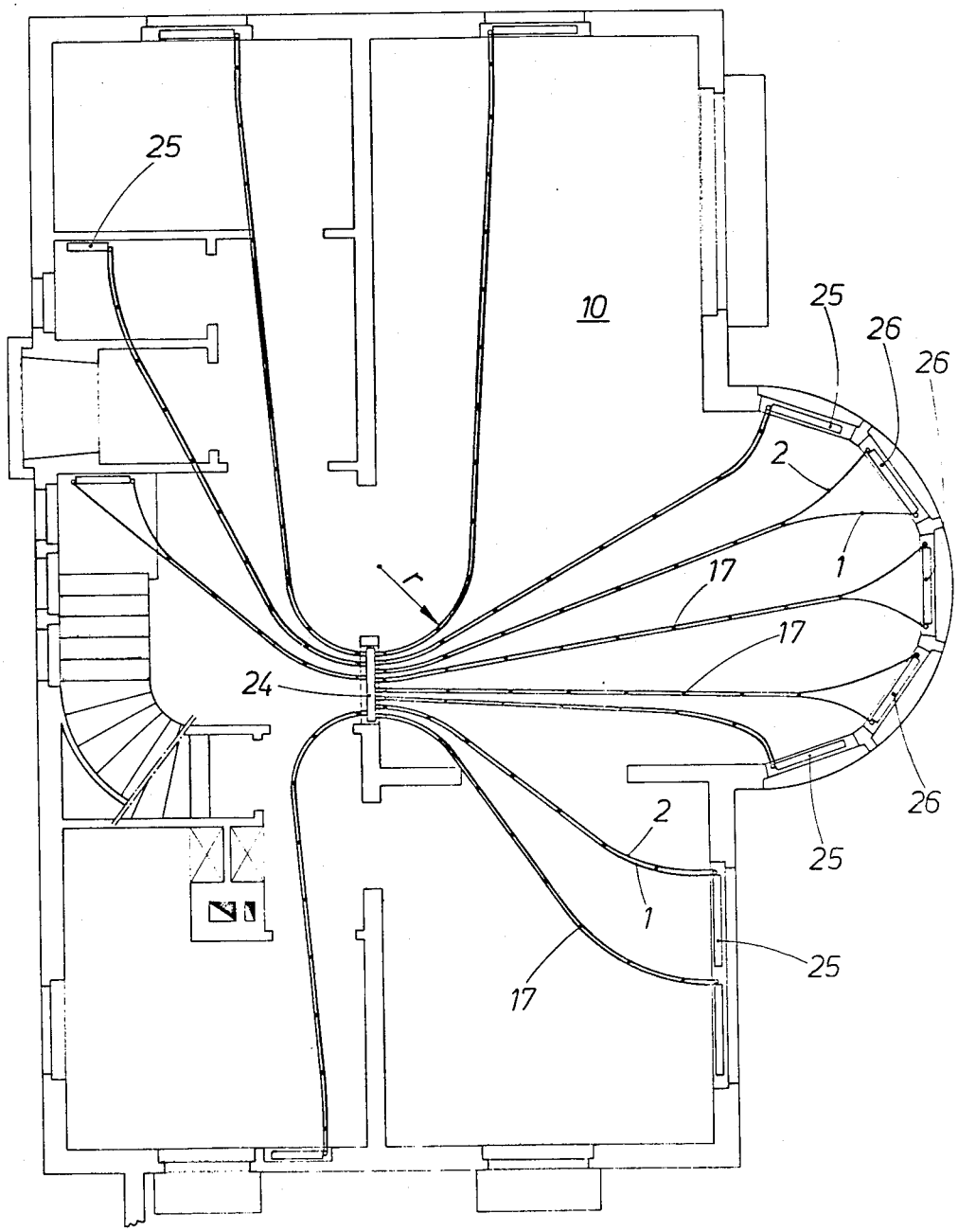
FIG. 7 shows an outline of a house in which double tubing according to the invention has been installed.

The double tubing shown in the drawing comprises two protective tubes 1, 2, which are embodied as so-called corrugated tubes; that is, they each have annular cylindrical sections 3, the outside diameter D of which determines the maximum outside diameter of each protective tube 1 or 2. Between each two such adjacent sections 3, which can also be called the crests of the corrugations, there are sections of smaller outside diameter d, which can be called hollows in the corrugations. The two protective tubes 1, 2 are integrally joined to one another by means of a web 5, which is disposed in the plane that extends through the two axes 6, 7, parallel to one another, of the two protective tubes 1, 2. Double tubing of this kind, in terms of its basic structure as described thus far, is known for example from German Pat. No. 12 18 574, and is typically sold as protective tubes for use in electrical installation.

Two separately attached inner tubes are disposed inside the two protective tubes 1, 2, one of these inner tubes serving as a flow line 8 and the other as a return line 9. The flow line 8 serves to supply warm or hot water to a radiator, and the return line 9 serves to remove the water cooled in the radiator.

The flow line 8 and the return line 9 are formed for example of a plastic that is on the one hand sufficiently thermally stable and on the other hand sufficiently flexible, so that they are capable of bending readily.

The double tubing is installed on the floor 10 of a house, or on the wall, with the flow line 8 already inserted into the protective tube 1 and the return line 9 already inserted into the protective tube 2. For fastening it to the floor 10 or wall, fastening holes 11 are provided, spaced apart from one another, each being between two adjacent opposed annular cylindrical sections 3 or in other words between the opposed crests of the two protective tubes 1, 2. A fastening hole 11 of this kind pierces the web 5, and as already noted, is formed in each case in the area between two crests 3. Each fastening hole 11 is defined on the sides of the two protective tubes 1, 2 by providing that the associated annular cylindrical section 3, that is, the associated crest, extends in the manner of a secant, so that this secant-like defining wall 12 at the level of the web 5 extends approximately at a tangent to the section 4 forming the hollow. From this, it can be found that the following relationship is applicable for the diameter a of the fastening hole:

$$a \leq s + D - d,$$

where s is the width of the web 5 between two adjacent crests of the protective tubes 1 and 2.

As seen particularly in FIG. 4, the particular defining wall 12 extending in secant fashion is disposed such that in the area of the web 5 it is radially offset toward the outside with respect to the section 4 (hollow) by the thickness b of the wall of the protective tube 1 or 2. In this case, the following equation is applicable for the diameter a of the fastening hole 11:

$$a = s + D - d - 2b$$

Also, for the width s of the web 5, $$b \leq s \leq 2b.$$

For the relationship of d to D, the following also applies:

$$d \approx 0.8D.$$

For a specific application, let
D=25 mm, d=20 mm, b=0.5 mm, s=0.8 mm, and a=4.8 mm.

The double tubing described is manufactured integrally by the so-called vacuum method between revolving mold halves that are attached to endless chains and form a progressively moving mold. This widely used technique is known for instance from U.S. Pat. No. 3,776,679.

This kind of manufacture produces a bead 13 in the manner of a welding seam, that is, a slight accumulation of material, in the transition zone between the web 5 and the protective tube 1 and the protective tube 2 and the inside of each tube. So that this bead 13 will not protrude too far inward through the secant-like defining wall 12 into the particular protective tube 1 or 2, the defining wall 12 is offset radially outward with respect to the section 4 by one wall thickness b, as described above. With this kind of manufacture, it is also possible to incline the defining wall 12 slightly outward, beginning at the web 5, toward the interior of the particular protective tube 1 or 2, which makes for easier unmolding of the double tubing after manufacture.

To prevent deformation of the protective tubes 1, 2 during fastening to the floor 10 or wall, fastening elements 14 as shown in FIGS. 5 and 6 are used. Fastening elements of this kind fill the approximately wedge-shaped area between the protective tubes 1 and 2 on either side of the web 5. As FIG. 5 shows, the two side faces 15, in the form of cylindrical sections, of each fastening element 14 press against the two sections 3 located opposite one another. A bore 16 in each fastening element 14 is in alignment with the fastening hole 11 in the double tubing, so that a fastening screw 17 passes from above through the bore 16 of an upper fastening element 14, through the fastening hole 11 and through the bore 16 of a lower fastening element 14, before its threaded potion 18 engages a dowel 19 in a corresponding bore 20 in the floor 10 or wall. For receiving the head 21 of the fastening screw 17, a countersunk recess 23 that is coaxial with the bore 16 is formed in the outer face 22 of each fastening element 14. As shown particularly in FIGS. 2 and 3, the outer face 22 of each fastening element extends at a tangent to the two protective tubes 1, 2 and accordingly extends approximately parallel to the plane passing through the axes 6, 7 of the protective tubes 1, 2. For this reason, the pressure exerted via the fastening element 14 associated with the head 21 when the fastening screw 17 is tightened is substantially transmitted to the floor 10 or the wall, via the fastening element 14 associated with the floor 10 or wall.

These provisions for preventing deformation of the protective tubes 1, 2 allow replacement of the tubes serving as the flow line 8 or return line 9 even after the double tubing has been installed. If one of the protective tubes 1, 2 were deformed during the installation, such a replacement would no longer be possible.

As shown in FIG. 7, a plurality of double tubes are installed, each beginning at a central distributing device 24, on the floor 10 of a house, leading to individual radiators 25, 26. With the radiators 25, where the flow line 8 and the return line 9 are connected to one side of the radiator 25, the double tube is extended up to the radiator 25 without the two protective tubes 1 and 2 being pulled apart after severing of the web 5. Severing of the web 5 and the corresponding spreading apart of the protective tubes 1 and 2 is performed at the radiators 26, in which the flow line 8 is connected to one side and the return line 9 is connected to the other side of the radiator 26.

Since on the one hand the web 5, as described above, has a very slight width s and since furthermore the double tubing is made of a relatively flexible plastic, such as polyethylene, the double tubing can be installed with very short radii of curvature without having to sever the web 5. For the specific application mentioned above, the radius of curvature r in the plane defined by the two axes 6, 7 is approximately equal to 150 mm. For a case not shown in the drawing, where the double tubing is extended upward on a wall from where it is installed on a floor 10, a radius of curvature of approximately 50 mm applies. In that case, the bending is at right angles to the plane defined by the axes 6, 7, which leads to the aforementioned reduction in the radius of curvature.

Since the double tubing is manufactured integrally, the protective tubes 1, 2 can basically not be made in different colors, as is actually typical for such tubes in plumbing applications. For this reason, a tube may be provided with one or more colored stripes 27, for example red on blue tubes or blue on red tubes. These colored stripes 27 are a means of facilitating assembly.

What is claimed is:

1. Double tubing comprising
    two flexible plastic protective tubes (1,2) integrally joined to one another via a web (5), said web extending along the lengths of said tubes, said tubes being embodied as corrugated tubes with annular cylindrical sections (3) of greater outside diameter (D) forming crests in the corrugation, wherein the adjacent annular cylindrical sections (3) of one protective tube (1 or 2) are each joined to one another via sections (4) of lesser diameter (d) forming hollows in the corrugation, and wherein the annular cylindrical sections (3) of the two protective tubes (1, 2) are located opposite one another in pairs, and
    fastening holes (11) for fasteners (17) provided in the web (5), each of these holes being disposed between the opposing two annular cylindrical sections (3) of a respective one of said pairs thereof, wherein the respective opposing annular cylindrical sections (3) for each said fastening hole (11) are deformed into secant-like defining walls (12) of the respective fastening hole (11),
    wherein the secant-like defining walls (12) of each fastening hole (11) extend approximately at a tangent to the sections (4) of lesser diameter (d).

2. Double tubing as defined by claim 1, wherein for the width (s) of the web (5) in the area of said annular cylindrical sections (3) of said greater outside diameter (D) located opposite one another in pairs, the relationship b≦s≦2b applies, where b is the wall thickness of each said protective tube (1, 2).

3. Double tubing as defined by claim 1, wherein disposed in each protective tube (1, 2) is a tube (flow line 8, return line 9) for plumbing applications.

4. Double tubing as defined by claim 1, wherein fastening elements (14) to be disposed on either side of the web (5) are provided, said fastening elements (14) having side faces (15) adapted to associated areas of the annular cylindrical sections (3) of the protective tubes (1, 2) wherein said two flexible protective tubes (1, 2) are not deformed by said fastening elements (14).

5. Double tubing as defined by claim 1, wherein each said fastening element (14) has an outer face (22) which extends at a tangent to both protective tubes (1, 2).

6. Double tubing as defined by claim 1, wherein said secant-like defining walls (12) of each said pair of opposite annular cylindrical sections (3) at each said fastening hole (11) incline slightly outward beginning at said web (5), into the respective one of said annular cylindrical sections on each side of a plane containing said web.

7. Double tubing as defined by claim 1, comprising at least one colored stripe provided in a predetermined one of said two flexible plastic protective tubes (1,2).

8. Double tubing as defined by claim 1, comprising a respective tube (8, 9) for plumbing applications in each of said two flexible plastic protective tubes (1, 2), wherein said greater outside diameter (D) is approximately 25 mm, said lesser diameter (d) is approximately 20 mm, and said two flexible plastic protective tubes (1,2) with said tubes (8,9) for plumbing applications can be bent with a radius of curvature at least as small as 150 mm in a plane containing central axes (6,7) of said two flexible plastic protective tubes (1,2), and with a radius of curvature at least as small as 50 mm perpendicular to said plane.

9. Double tubing as defined by claim 1, wherein said greater outside diameter (D) is approximately 25 mm, and said lesser diameter (d) is approximately 20 mm.

10. Double tubing as defined by claim 3, wherein said greater outside diameter (D) is approximately 25 mm, said lesser diameter (d) is approximately 20 mm, and said two flexible plastic protective tubes (1,2) with said tubes (8,9) for plumbing applications can be bent with a radius of curvature at least as small as 150 mm in a plane containing central axes (6,7) of said two flexible plastic protective tubes (1,2) and with a radius of curvature at least as small as 50 mm perpendicular to said plane.

11. Double tubing as defined by claim 4, comprising a respective tube (8, 9) for plumbing applications in each of said two flexible plastic protective tubes (1, 2) wherein said greater outside diameter (D) is approximately 25 mm, said lesser diameter (d) is approximately 20 mm, and said two flexible plastic protective tubes (1,2) with said tubes (8,9) for plumbing applications can be bent with a radius of curvature at least as small as 150 mm in a plane containing central axes (6,7) of said two flexible plastic protective tubes (1,2), and with a radius of curvature at least as small as 50 mm perpendicular to said plane.

12. Double tubing as defined by claim 2, wherein a ratio of said greater outside diameter (D) of each said flexible plastic protective tube (1 or 2) to a radius of curvature of said two flexible plastic protective tubes (1, 2) in a plane containing central axes of said two flexible plastic protective tubes (1,2) is at least approximately 25 mm/150 mm=1/6.

13. Double tubing as defined by claim 2, wherein a further ratio of said greater outside diameter (D) of each said flexible plastic protective tube (1,2) to a further radius of curvature perpendicular to said plane is at least approximately 25 mm/50 mm=½.

14. Double tubing as defined by claim 4, each said fastening element 14 having a bore (16) for alignment with the respective fastening hole (11) in said web (5).

* * * * *